United States Patent [19]
Rhodes et al.

[11] Patent Number: 4,806,066
[45] Date of Patent: Feb. 21, 1989

[54] ROBOTIC ARM

[75] Inventors: Guy W. Rhodes, Los Altos Hills; John W. Hill, Palo Alto; Clement M. Smith, Portola Valley; Thomas M. Grimm, Santa Clara, all of Calif.

[73] Assignee: Microbot, Inc., Sunnyvale, Calif.

[21] Appl. No.: 779,159

[22] Filed: Sep. 23, 1985

Related U.S. Application Data

[63] Continuation of Ser. No. 438,314, Nov. 1, 1982, abandoned.

[51] Int. Cl.⁴ .............................................. B25J 9/10
[52] U.S. Cl. .................................. 414/729; 74/89.22; 74/469; 254/286; 254/393; 318/568; 364/513; 474/203; 901/9; 901/21
[58] Field of Search ................. 414/4, 5, 7, 680, 729, 414/730, 735, 917; 474/203; 74/469, 89.22, 89.21, 479; 3/12; 254/374, 390, 393, 286, 270; 250/231 SE; 901/21, 9; 364/513; 318/603, 568

[56] References Cited

U.S. PATENT DOCUMENTS

| | | | |
|---|---|---|---|
| 636,138 | 10/1899 | Hatfield | 403/393 X |
| 2,685,082 | 7/1984 | Beman et al. | 340/271 |
| 4,078,670 | 3/1978 | Francois et al. | 214/1 CM |
| 4,221,997 | 9/1980 | Flemming | 414/4 X |
| 4,259,876 | 4/1981 | Belyanin et al. | 74/469 |
| 4,340,848 | 7/1982 | Hanagata et al. | 318/603 X |
| 4,362,977 | 12/1982 | Evans et al. | 364/513 X |
| 4,386,270 | 5/1983 | Ezekiel | 250/239 X |
| 4,495,453 | 1/1985 | Inaba et al. | 318/603 X |

FOREIGN PATENT DOCUMENTS 0008981 3/1980 European Pat. Off. ............. 901/21

OTHER PUBLICATIONS

"Digital Technology Enables Robots to 'See'", Shapiro, Computer Design, Jan. 1978.
"N, Electron Today Inc.", vol. 10, No. 9, Issued Sep. 1981, Robot Arm, see pp. 50-56.
"Minicomputer Control Robot's Six Electrohydraulic Servoactuators", Hydraulics & Pneumatics, Feb. 1982, pp. 53-58.
"International Robotics Industry Directory", Fourth Edition, Editor-Philip C. Flora, Technical Data Base Corporation, Post Office Box 720, Conroe, Texas 77305, USA, selected pages.
Brochure, "ASEA Industrial Robot System IRb-60", Jun. 1975, eight pages.
"International Machine Intelligence Robot System User's Manual", Publication No. 10898, Publ. Master Rev. A, International Machine Intelligence; 330 Potrero Avenue, Sunnyvale, CA 94086, Mar. 1983, selected pages.
Yaskawa Electric Mfg. Co., Ltd./Japan, Operator's Manual, Aug. 1982, HW8480245, pp. 1, 15-17.

*Primary Examiner*—Robert J. Spar
*Assistant Examiner*—Donald W. Underwood
*Attorney, Agent, or Firm*—Limbach, Limbach & Sutton

[57] ABSTRACT

A robotic arm and control system comprising a multi-axis, open-loop system of coupled structural members, wherein each structural member is pivotably coupled to one another to form a number of joints, wherein position calibration is provided by way of position sensors disposed at each joint, and controls for manipulating each joint in a predetermined manner and for monitoring the output of each position sensor, the controls first causing all structural members to move with respect to one another so that each position sensor outputs a home signal, the controls then manipulating each structural member in a predetermined sequence until each structural member is caused to be within a predetermined distance from its home position.

25 Claims, 6 Drawing Sheets

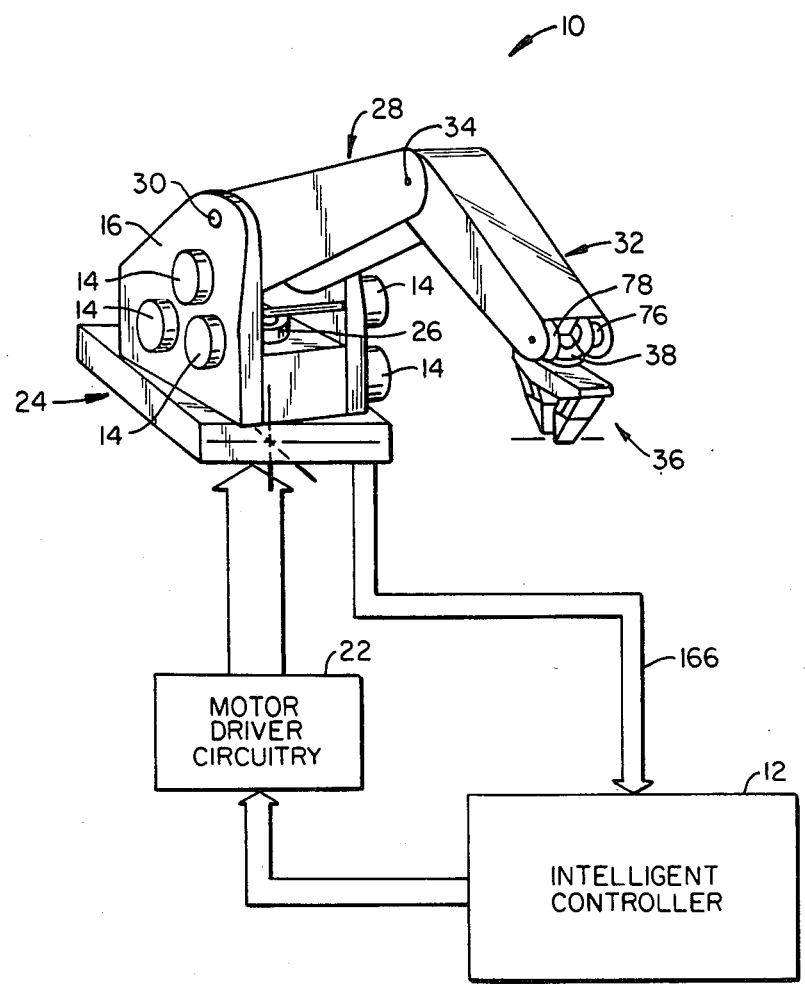
FIG._1.

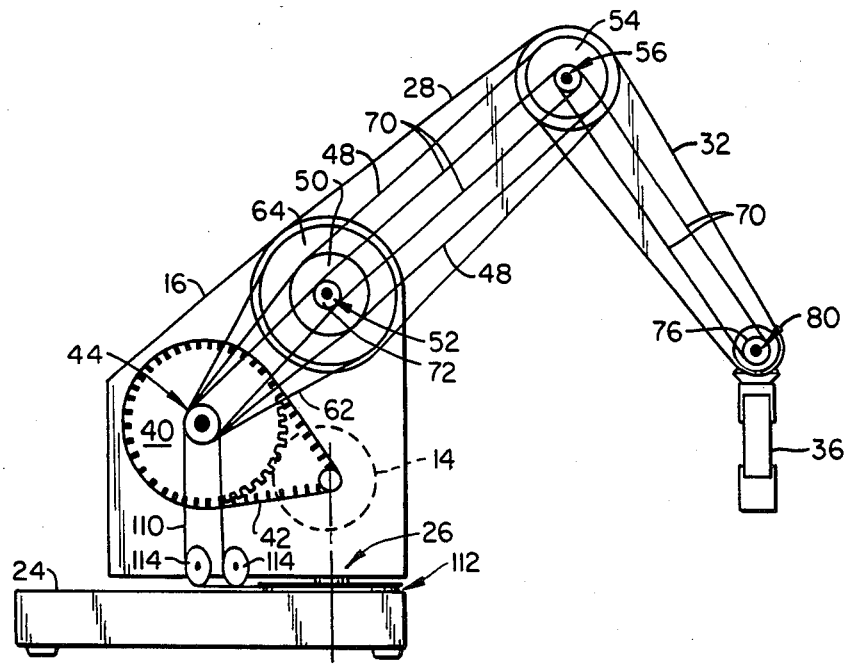
FIG._2.
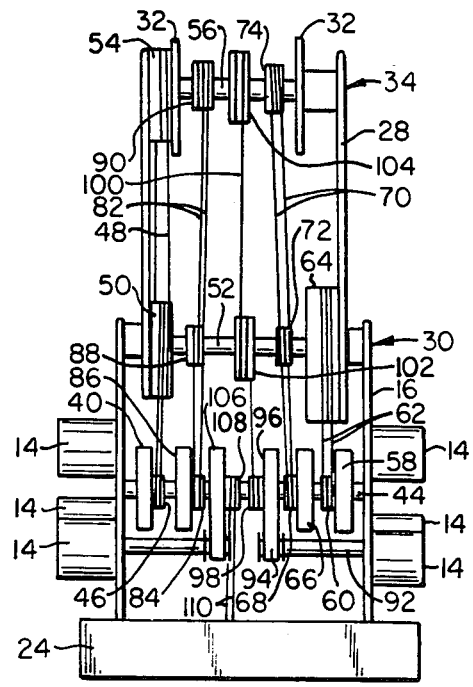
FIG._3.

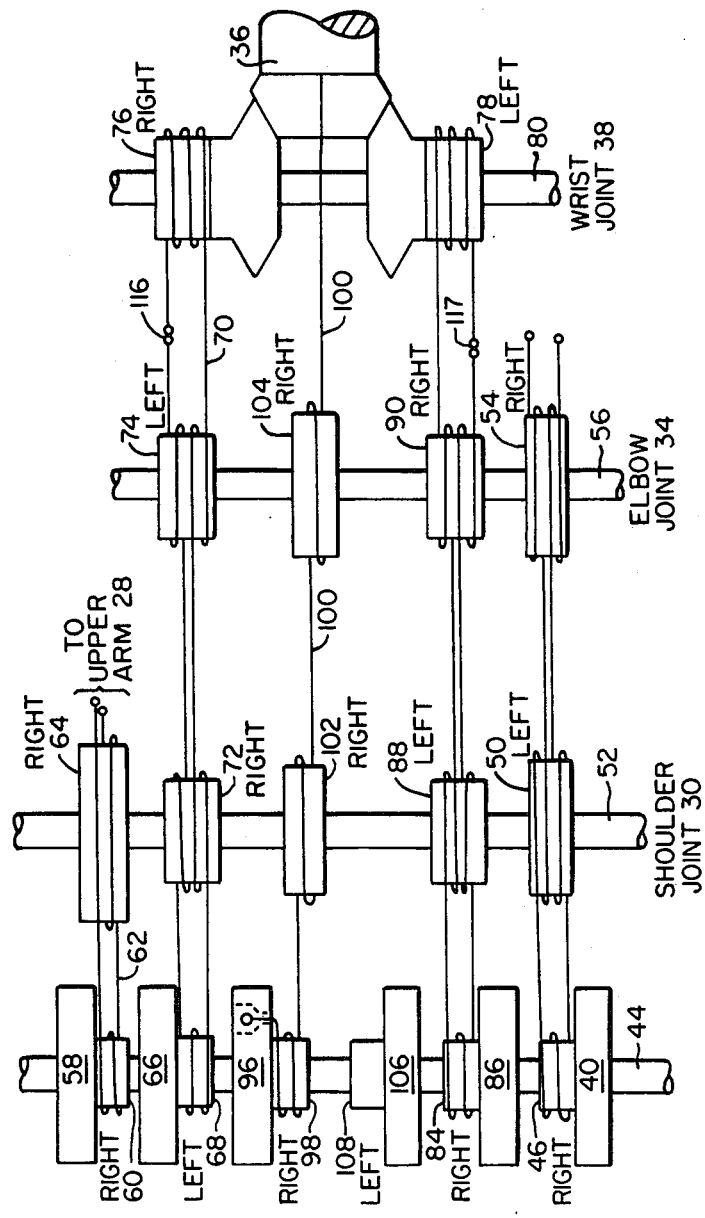
FIG._9.
FIG._5.

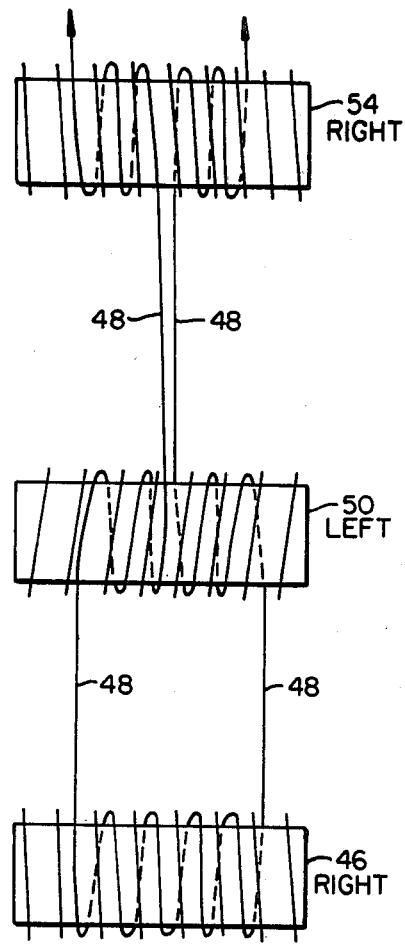
FIG._4.
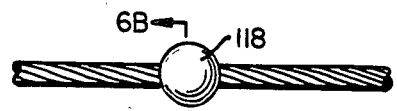
FIG._6A.
FIG._6B.
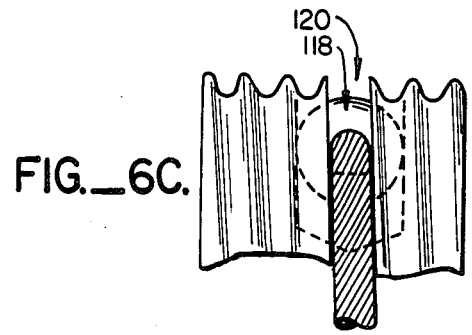
FIG._6C.
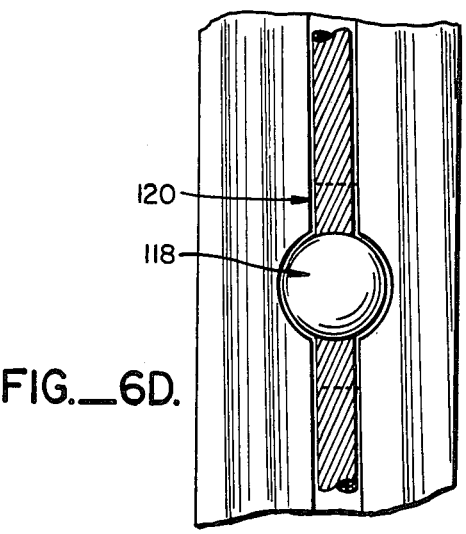
FIG._6D.

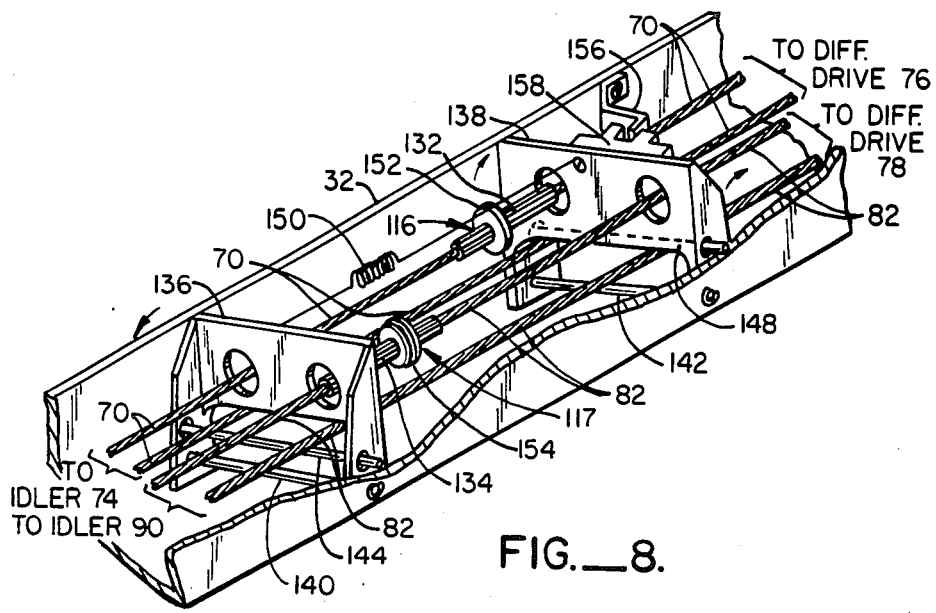
FIG._8.
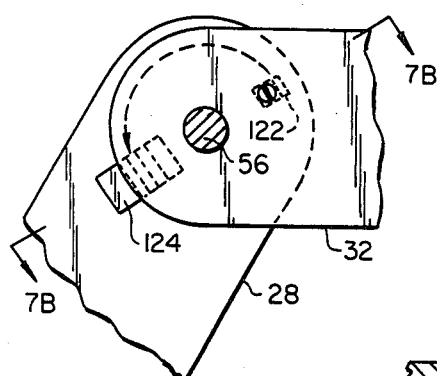
FIG._7A.
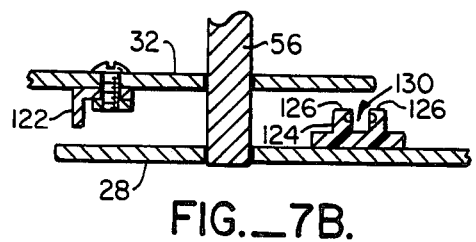
FIG._7B.

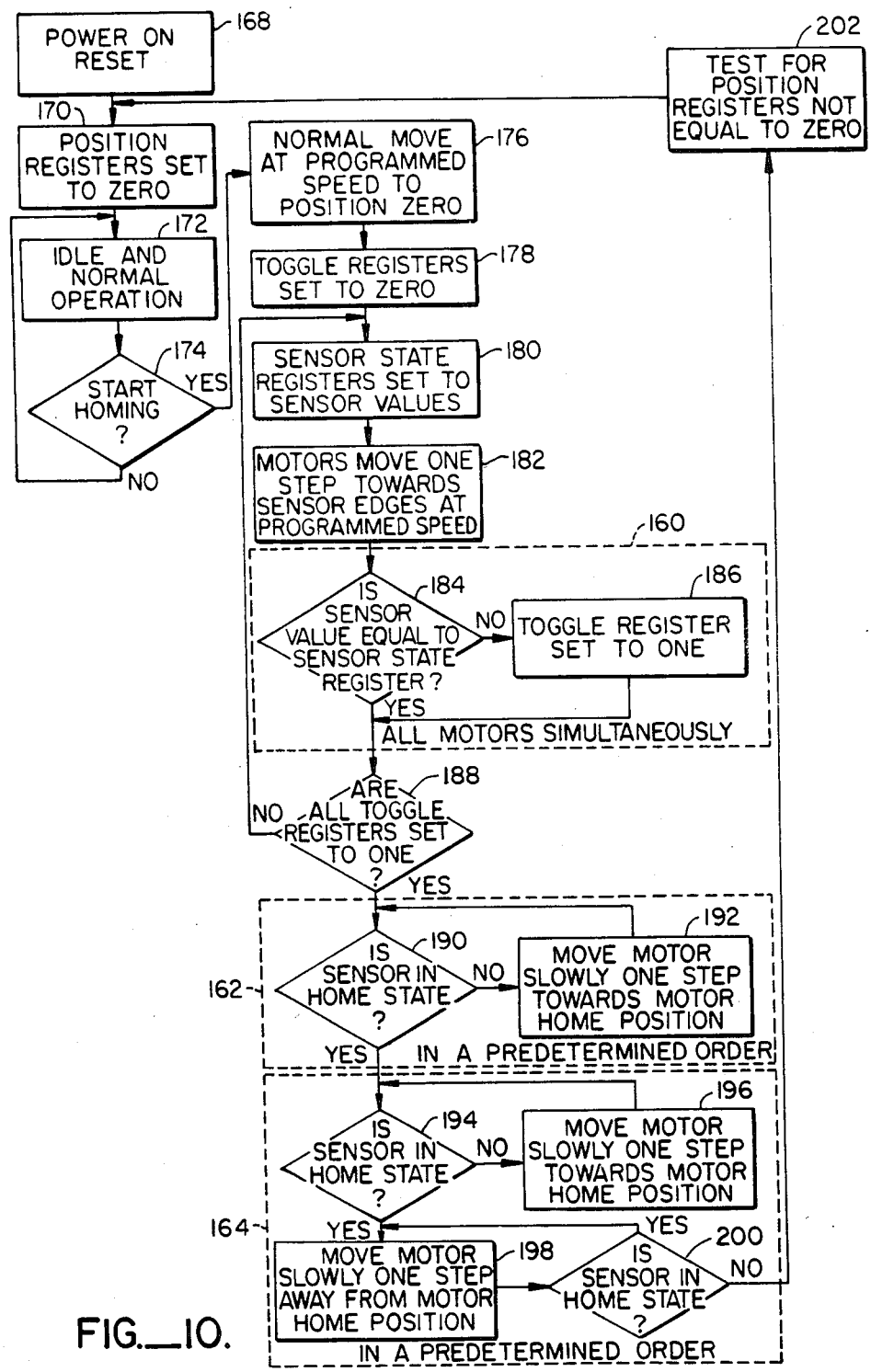
FIG._10.

ROBOTIC ARM

This is a continuation of application Ser. No. 438,314, filed Nov. 1, 1982 now abandoned.

TECHNICAL FIELD

The present invention relates generally to robots and robot control and, more particularly, to partial open-loop control of tendon manipulated robot arms.

BACKGROUND ART

In the past, robotic arms have been constructed and designed for use as either expensive, complex and heavy-duty arms for heavy industrial use, or inexpensive, light-duty arms for educational and robotic research purposes. With respect to the industrial arms, closed-loop control systems are typically utilized with drive motors and shaft encoders often located at each of the joints. Typical of these robots are those manufactured by Unimation Corporation and Cincinnati Milacron Corporation. The closed-loop configuration, as well as the use of shaft encoders and drives at each joint, permits an arm in which precise control can be realized. However, due to the added weight at each joint, the structural components must be strengthened accordingly. In turn, the drive mechanisms must also be increased in capacity. As a result, such heavy-duty robots are expensive, bulky and of great size.

Conversely, with respect to the light-duty, educational type robotic arms, such as those arms manufactured by the assignee of the present invention, the drive motors for each segment of the arm are located at the base of the arm, with the motive energy being transmitted to each joint by way of a cable and pulley system, utilizing tendon technology. This, in turn, permits each segment of the arm to be of significantly lighter weight. In order to keep costs down, such an arm is controlled open-loop. That is, the position of each member is controlled by keeping track of the signal supplied to the motor drives, with the assumption that the particular member will move exactly in accordance with the drive signal supplied thereto. Such a configuration provides an inherent problem, that of keeping track of the actual position, versus the commanded position, of the arm, and each of its structural members. With open-loop control, the arm is susceptible to mispositioning due to a number of factors, such as an external force which causes the arm to be bumped out of its current position and into another different position. The control circuitry for this open-loop configuration will have no way of detecting that such an event occurred. Additionally, as is the case in most mechanical motion involving movement over a series of different paths, the cumulative error in and of itself may result in a positional difference from that which has been commanded. Another source of mispositioning is slippage of the motor drives. For example, when stepper motors are used, such stepper motors are susceptible to slippage when a force greater than the maximum torque suppliable by the stepper motor is presented by an external object.

With respect to the tendon-type robotic arms in which drive motors are mounted on the base of the arm, there is an additional problem in designing a position calibration system. This problem involves the intercoupling between each of the segments of the arm. The typical robotic arm is comprised of a number of structural members, each structural member being linked to another by way of a joint. The cables or tendons by which rotational energy is transferred, from the motor drives on the base to the structural members, are themselves routed to the desired structural member via other structural members and joints. As such, the movement of a particular structural member can affect the position of other structural members. This, in part, is due to the manner in which the cables pass through a particular structural member on their way to the structural member to be driven. Typically, an idler pulley is located on an intermediate joint. The cable is wrapped about this idler pulley. The structural member driven by that cable is positioned at the end of the intermediate structural member which pivots about the joint on which the idler pulley is positioned. Thus, when that intermediate structural member is moved, and where the motor drive for the idler pulley does not move, the movement of the intermediate structural member causes the cable to wrap or unwrap an additional amount about the idler pulley. To the structural member to which the cable is connected, this wrapping or unwrapping looks like the motor drive is causing the cables or tendons to be moved. Thus, this structural member moves when the intermediate structural moves. Conversely, certain of the structural members do not influence the position of other structural members. Typically, these members are located at the end of a series of coupled members. This is because there are no idler pulleys associated with other structural members on the joint to which these "end" members are connected.

As a result of the intercoupling of the various structural members, the manner in which the position of each structural member is calibrated is no longer straight-forward. Any calibration system design must take into account this intercoupling and deal with it effectively.

SUMMARY OF THE INVENTION

The foregoing and other problems of prior art robotic arms are overcome by the present invention of a method and apparatus for manipulating a tendon controlled robotic arm in a multi-axis, open-loop system of coupled structural members, wherein each structural member is pivottably coupled to another of the structural members to form a number of joints, for position-calibrating each structural member comprising position sensor means located at each joint for providing a home signal when the structural members associated with the joint are in a predetermined orientation; and control means responsive to the home signal from each position sensor means for modifying the position of each structural member in a predetermined order and by predetermined positional increments so that each of the structural members is caused to be positioned with respect to one another such that all position sensors simultaneously provide home signals.

In one embodiment of the present invention, each of the structural members are controlled by one or more separate motors. The motor is coupled to the particular structural member by way of a cable/pulley drive train. The present invention provides position calibration of the various structural members with respect to one another by providing drive signals to each of the motor/cable/pulley drive arrangements in response to the output states of the position sensors. The first step of the procedure is to simultaneously modify the position of all structural members in the direction of the home position of each structural member until a change in state for each of the associated position sensors is encountered.

The next step is to move the structural members in an ordered sequence, one by one, until each structural member has encountered its home position. The final step is to move each structural member, in an ordered sequence, one predetermined position increment away from its home position, to verify that the home position has been encountered.

The present invention also provides an apparatus and method for securing and routing the various drive cables to the pulley structures so that a more positive coupling between the motors and the structural members can be obtained.

Also provided is a position sensor structure by which the position of a cable with respect to a structural member can be sensed.

It is therefore an object of the present invention to provide an apparatus for position calibrating a multi-axis, open-loop system of coupled structural members.

It is a further object of the present invention to provide an apparatus for position calibration of a multi-axis, open-loop system of coupled structural members, wherein each structural member is driven by a motor/cable/pulley arrangement.

It is another object of the present invention to provide an apparatus for position calibration of a multi-axis, open-loop system of coupled structural members, wherein each structural member is driven by a motor/cable/pulley arrangement and further wherein each of the pulleys are grooved in a sequence of alternating right and left handed pitches in order to guide the cables thereon, and further wherein the cables are positively anchored to each pulley by way of a fitting which has been swaged to the cable and inserted into a hole in a slot in each pulley.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a simplified block diagram of the robotic arm and control system of the present invention.

FIG. 2 is a simplified depiction of the robotic arm of the present invention, illustrating the motor/cable/pulley drive arrangement.

FIG. 3 is a rear view of the robotic arm of the present invention, illustrating the routing and positioning of the various pulleys and cables on two of the joints.

FIG. 4 is a diagram illustrating the arrangement of the pitch of the grooves for each pulley in a sequence of pulleys according to the present invention.

FIG. 6a illustrates the positioning of a spherical member upon a cable in accordance with the present invention.

FIG. 6b is a cross-section of the spherical member of FIG. 6a taken along lines 6b—6b.

FIG. 6c illustrates the positioning of the swaged spherical member and cable with respect to a pulley.

FIG. 6d is a top view of the spherical member which has been swaged to a cable and positioned in a slot on a pulley in accordance with the present invention.

FIG. 5 illustrates the cabling and pulley arrangements for the various structural members of the present invention.

FIG. 7a illustrates one embodiment of a position sensor.

FIG. 7b illustrates a cross-section of the position sensor or FIG. 7a, taken along lines 7b—7b.

FIG. 8 is a cut-away view of an embodiment of a position sensor for sensing the position of a cable.

FIG. 9 is a simplified block diagram of the method of position calibrating of the present invention.

FIG. 10 is a more detailed block diagram of the method of position calibration of the present invention.

DETAILED DESCRIPTION OF THE INVENTION

Referring to FIG. 1, the basic components by which the present invention is implemented will now be briefly explained.

The robotic arm 10 is controlled by an intelligent controller 12. The intelligent controller 12 provides motor drive signals to motors 14, such as stepper motors shown mounted on the body 16 of the arm 10, via motor driver circuitry 22.

The robot arm 10 is comprised of several structural members. A base 24 is provided to support the other structural members. A body 16 is mounted for rotation in a plane horizontal to the plane of the base by way of base joint 26. Such a joint can be considered to be a swivel joint. Upper arm 28 is mounted at one end to body 16 by way of a shoulder joint 30. This shoulder joint can be termed a hinge joint. The other end of upper arm 28 is coupled to forearm 32 by way of elbow joint 34. Elbow joint 34 can also be described as a hinge-type joint. Hand or gripper 36 is coupled to forearm 32 by way of wrist joint 38. Wrist joint 38 is a differential joint.

The differential joint which couples hand 36 to forearm 32 permits hand 36 to be positioned with respect to forearm 32 in any position within a partial sphere which extends from at the top of forearm 32, in an upward arc therefrom, and terminates toward the bottom of forearm 32. Hand 36 can be rotated anywhere within this partial sphere.

The elbow joint 34 permits forearm 32 to be pivotted in a common plane with respect to upper arm 28 over approximately 180 degrees.

Shoulder joint 30 permits upper arm 28 to be pivotted in a common plane, with respect to body 16, over approximately 180 degrees. Finally, base joint 16 permits body 16 to be rotated with respect to base 24 in a plane horizontal to base 24 over nearly 360 degrees.

Referring to FIG. 2, the manner in which motors 14 control the position of each of the structural members will now be described. For purposes of explanation, a single motor 14 is shown. Also, assume that motor 14 is a stepper motor. It is to be understood that, in practice, there will be a plurality of stepper motors with each stepper motor being assigned to control a particular structural member.

Stepper motor 14 is mounted to body 16 and coupled to a timing belt gear 40 via a timing belt 42. Timing belt gear 40 is mounted for rotation on a common drive shaft 44. The timing belt gears associated with the other stepper motors are also mounted on this common drive shaft 44. A drive capstan 46 is coupled for rotation with timing belt gear 40 and also mounted on common drive shaft 44. See FIG. 3. Thus, as stepper motor 14 rotates, timing belt 42 transfers the rotational motion to timing belt gear 40. As timing belt gear 40 rotates, capstan 44 is caused to rotate about common drive shaft 44. Assume for purposes of explanation that the particular stepper motor 14 shown is assigned to drive the cables for movement of forearm 32. A cable 48 is wrapped a predetermined number of times about capstan 46. One end of cable 48 is then wrapped about idler pulley 50 from the top. Idler pulley 50, is supported for rotation by shoulder axle 52, which in turn forms a part of shoulder joint 30. The other end of cable 48 is wrapped about idler pulley 50 from the bottom thereof. The ends of cable 48 are then extended through upper arm 28 and wrapped about drive pulley 54. Drive pulley 54 is rotatably mounted on elbow axle 56 and fixedly secured to the end of forearm 32. As before, one end of cable 48 is wrapped about drive pulley 54 from the top, while the other end of cable 48 is wrapped about drive pulley 54 from the bottom. The free ends of cable 48 are then secured to forearm 32. Elbow axle 56 forms a part of elbow joint 34.

Thus, as capstan 46 is caused to rotate by the rotation of timing belt gear 40, such rotation is transferred to the elbow drive pulley 54 via cable 48 and idler pulley 50. Because drive pulley 54 is fixedly attached to the end of forearm 32, the rotation of drive pulley 54 causes forearm 32 to pivot about elbow joint 34.

In a similar manner, a stepper motor 14, timing belt, timing gear, capstan, idler pulley, drive pulley, and drive cable configuration is utilized to drive each of the other structural members. From FIG. 3, the positioning of the timing belt gears on common drive shaft 44 can be seen. Also, the positioning of the various idler pulleys and drive pulleys on shoulder axle 52 can also be seen. Finally, FIG. 3 illustrates the positioning of various idler pulleys and drive pulleys on elbow axle 56. Also shown is the routing of the various drive cables between the capstans, idler pulleys and drive pulleys between the common drive shaft 44, shoulder axle 52 and elbow axle 56.

From FIG. 3, it can be seen that timing belt gear 58 causes capstan 60 to rotate. This rotational motion is transferred via drive cable 62, to shoulder drive pulley 64. Shoulder drive pulley 64 is fixedly attached to upper arm 28 and rotatably mounted on shoulder axle 52.

Similarly, from FIG. 3, it can be seen that timing belt gear 66 drives capstan 68, which in turn controls drive cable 70. Drive cable 70 can be seen to wrap around idler pulley 72, which is rotatably mounted on shaft 52 of shoulder joint 30. Drive cable 70 extends through upper arm 28 to wrap around idler pulley 74, which is rotatably mounted on elbow axle 56 of elbow joint 34. From FIG. 2, it can be seen that drive cable 70 extends from idler pulley 74 through forearm 32 to wrap around differential drive pulley 76. Differential drive pulley 76 can be seen more clearly in FIG. 1. Rotation of differential drive pulley 76 in conjunction with the complementary differential drive pulley 78 acts to change the position of hand 36. Differential pulleys 76 and 78 are rotatably mounted on wrist axle 80 which is located in wrist joint 38. Differential pulleys 76 and 78 each drive a bevel gear. In turn, each bevel gear meshes with a bevel gear on the hand 36. By rotating differential pulleys 76 and 78 in the same direction, pitch is achieved. By driving differential pulleys 76 and 78 in the opposite direction, roll is achieved.

The cable which drives differential pulley 78 is shown in FIG. 3, and is labelled with reference designation 82. This cable is driven by capstan 84 and timing belt pulley 86. Drive cable 82 passes around idler pulley 88 which is mounted on shoulder axle 52 and around idler pulley 90 which is mounted on elbow axle 56.

Remaining with FIG. 3, it can be seen that a stepper motor 14 drives a shaft 92 which, in turn, drives timing belt 94. Timing belt 94, in turn, drives timing belt gear 96, and hence capstan 98. Capstan 98, in turn, drives cable 100. Cable 100 is wrapped around idler pulley 102 which is rotatably mounted on shoulder axle 52. Additionally, cable 100 is wrapped around idler pulley 104 which is rotatably mounted on elbow axle 56. Although not shown in FIG. 2, drive cable 100 extends as a single length through forearm 32 to hand 36. Cable 100 is utilized to open and close hand 36.

Finally, from FIGS. 2 and 3, it can be seen that timing belt 106 is driven by a stepper motor to drive capstan 108. In turn, capstan 108 drives cable 110. Cable 110 is routed to base pulley 112 via idler pulley 114. The purpose of idler pulleys 114 is to change the direction of cable 110 so that the cable feed is tangent to the surface of both capstan 108 and base drive pulley 112.

By utilizing a timing belt to transfer the rotation of the stepper motor 14 to the timing belt gear, the amount of gearing backlash in the gearing is significantly reduced.

Structuring of the drive mechanism as described above results in a multi-axis system of coupled structural members. What is meant by this terminology is that the movement of certain of the structural members will cause a resulting movement of other structural members. Conversely, the movement of certain different structural members will not influence the position of other structural members.

In order to better understand this relationship, reference is made to FIG. 2. In the system of structural members as interconnected as described above, movement of the structural member represented by the upper arm 28 about shoulder joint 30 will result in a change in orientation of forearm 32 with respect to upper arm 28 and a change in orientation of hand 36 with respect to forearm 32. Similarly, a change in position of forearm 32 about elbow joint 34 will result in a change in orientation of hand 3 with respect to forearm 32, as well as a change in the opened/closed condition of hand 36.

Conversely, a change in position of hand 36 with respect to forearm 32 will not result in any change in position in any of the other structural members. Thus, it can be seen that there is, what can be loosely termed, a unidirectional coupling of the structural members. With respect to the drive configuration described above, this coupling is considered to be in an outward direction, where the direction is referenced to the base 24.

The reason for such coupling can be best explained by way of example. Referring to cable 48, associated with drive pulley 54 and forearm portion 32, it can be seen that when the upper arm 28 is rotated about shoulder joint 30, and when capstan 46 associated with drive cable 48 remains stationary, the effect is to wrap one of the segments of cable 48 about idler pulley 50. The other segment of cable 48 is unwrapped from around idler pulley 50 to a corresponding degree. From the point of view of elbow drive pulley 54, this wrapping and unwrapping is equivalent of a rotation by capstan 46. Thus, elbow drive pulley 54 rotates in response to the movement of upper arm 28, thereby causing forearm 32 to move. In general, it can be said that where a drive cable is routed about an idler pulley located on a particular joint, and where the orientation of the structural members associated with that joint are changed, the drive cable associated with the various idler pulleys on that joint will be wrapped around and unwrapped from those idler pulleys. This, in turn, will cause the structural members with which the drive cables are associated to move. Thus, because the shoulder axle 52 has a large number of idler pulleys mounted thereon, it follows that upper arm 28 is coupled to the greatest extent to the other structural members. From FIG. 3, it can be seen that elbow axle 56 supports the idler pulleys for the differential drive of hand 36, as well as the open and close drive for the hand 36. Thus, movement of forearm 32 about elbow joint 34 will cause a corresponding movement of hand 36. Conversely, since no idler pulleys are located on either base joint 26 or wrist joint 38, there is no coupling of the base or hand to the remainder of the structural members.

The above-discussed inter-relationship or coupling between the various structural members must be taken into account when deciding upon the position commands to be supplied to each stepper motor in order to obtain a predetermined orientation of the various structural members. The above relationship is also significant when position calibration of the various structural members is required. As such, position calibration is neither straight forward nor simple.

In implementing the above described cable drive system, it has been found that certain refinements enhance the performance of the system. Among these refinements are the use of grooves in the drive pulley, the idler pulleys and the capstans, as well as a specific orientation of the grooves therein in relation to the grooves on the previous and subsequent pulleys or capstans in the drive sequence. More specifically, it has been found that, by providing a pulley which is spirally grooved, cable life is increased. The grooving also helps to ensure that the cables remain on the pulley under normal operating conditions. In the past, side plates were required to be mounted with each pulley to prevent the cables from falling off from the pulley during normal operation. With the use of a grooved pulley, this problem has been solved. Of course, where extraordinary load conditions are encountered, such as collisions with external objects, flanges are useful in keeping the cables in place.

It has additionally been discovered that in a capstan, idler pulley, drive pulley sequence, by alternating the pitch of the grooves so that the pitch changes alternatively in orientation from right to lefthanded from element to element within the sequence, cable wear can be minimized, and the grooves themselves made more shallow. For example, referring to FIG. 3, and more specifically to capstan 46, idler pulley 50 and drive pulley 54. The grooves on each of these elements, when arranged in accordance with the present invention, vary from a righthanded pitch on the capstan 46, to a lefthanded pitch on the idler pulley 50, and to a righthanded pitch on the drive pulley 54. This relationship is shown in greater detail in FIG. 4. The advantage of arranging the pitch of the grooves in an alternating manner from pulley to pulley is that the cable can now exit and enter the grooves on the pulleys in better alignment therewith. As the cable exits from capstan 46, it extends in a substantially straight line to a corresponding groove on idler pulley 54. Cable 48 is then wrapped around idler pulley 54 in a direction which is determined by the pitch of the grooves thereon. For the portion of cable 48 which enters idler pulley 54 from the top, the pitch of idler pulley 54, which is a lefthanded pitch, causes that portion of cable 48 to be wrapped toward the interior of idler pulley 54. Similarly, for the portion of cable 48 which enters from the bottom of idler pulley 54, the cable is also wrapped toward the interior of idler pulley 54.

If, on the other hand, idler pulley 54 were of the same pitch orientation as capstan 46, the cable portion which enters idler pulley 54 from the top would be wrapped in a direction toward the exterior of the pulley. Similarly, the portion of cable 48 which enters idler pulley 54 from the bottom would be wound in a direction toward the exterior of the pulley. It can be seen that, in order to accommodate both sections of cable 48 on an idler pulley having the same pitch orientation as the pulley or capstan feeding it, both cable portions must enter the idler pulley at its center so that they can then be wound, according to the pitch, toward the exterior of idler pulley 54. With this requirement it can be seen that the angle of entry is much more accute than when an alternating pitch direction is used. The more accute entry angles of the non-alternating pitch arrangement results in greater cable wear due to the rubbing of the cables against the sidewalls of the grooves. Additionally, the grooves themselves must be made deeper in order to maintain the cables within the grooves.

On the other hand, because an alternating pitch arrangement permits the cable to enter and exit the grooves of a pulley in better alignment with the grooves, cable wear is significantly reduced, and the depths of the grooves can also be reduced.

In FIG. 5, the location and groove pitch of each of the pulleys is shown. Capstan 60 and shoulder drive pulley 64 both have a righthanded pitch. This is because only one end of cable 62 is wrapped around shoulder drive pulley 64. The other end of cable 62 is positioned over a small portion of shoulder drive pulley 64. As can be seen from FIG. 5, the ends of drive cable 62 are secured to the upper arm 28.

With respect to the drive arrangement for differential drive pulley 76, capstan 68 has a lefthanded pitch, idler pulley 72 has a righthanded pitch, idler pulley 74 has a lefthanded pitch, and differential drive pulley 76 has a righthanded pitch. As such, drive cable 70 from capstan 68 enters idler pulley 72 from the exterior thereof and exits therefrom from the interior of drive pulley 72. Cable 70 from idler pulley 72 enters idler pulley 74 from the interior thereof and exits from the exterior thereof. Finally, cable 70 from idler pulley 74 enters differential drive pulley 76 from the exterior of the drive pulley. It is to be noted that the ends of drive cable 70 are joined together at a joint 116. The ends of cable 70 are joined in this manner for purposes of convenience, there being no convenient point on drive pulley 76 to which the cable ends can be secured.

The drive linkage for differential drive pulley 78 is similar to that for differential drive pulley 76, except that the pitch variation is from a righthanded pitch at capstan 84 to a lefthanded pitch at idler pulley 88 to a righthanded pitch at idler pulley 90 and finally to a lefthanded pitch at differential drive pulley 78.

Referring to the middle of FIG. 5, cable 100, which opens and closes hand 35, is shown as a single length which is wrapped around capstan 98, idler pulley 102, and idler pulley 104. The grooves for all of these elements are orientated in a righthand pitch. The other end of cable 100 is shown anchored to the drive gear 96. By providing a groove pitch of the same orientation for this drive link, the position of the cable can be shifted toward the center of the robotic arm as the cable is extended therethrough. Note that timing belt gear 96 and capstan 98 are positioned off-center and on common drive shaft 44. Thus, there is a need to shift the position of cable 100 towards the center of the arm 10 so that cable 100 will be centered when it enters hand 36. The righthand pitch of the grooves on idler pulley 102 and idler pulley 104 cause the cable, as it is wrapped around each idler pulley, to progress from the left to right and thereby towards the center of the arm.

Finally, as was shown in simplified form in FIG. 4, it can be seen from FIG. 5 that the drive linkage for elbow drive pulley 54 provides for a righthand capstan 46, a lefthand idler pulley 50, and a righthand drive pulley 54.

FIGS. 6a through 6d illustrate a further feature of the present invention. It has been discovered that, by swaging a spherical ball onto each drive cable and then positioning this swaged ball in a slot in the capstan associated with the drive cable, that a more positive drive capability and easier assembly is achieved. This is because positioning of the ball within the groove fixes the position of the cable with respect to the capstan. This procedure is also utilized for positively positioning a cable with respect to each of the idler pulleys.

FIG. 6a shows the positioning of the ball 118 on a drive cable. FIG. 6b illustrates a cross-section of ball 118 taken along lines 6b—6b of FIG. 6a. FIG. 6c illustrates the positioning of the swaged ball within slot 120 which has been cut into a capstan or idler pulley. FIG. 6d is a top view of the swaged ball as it is positioned within a slot 120.

In practice, each of the cable portions which are wrapped around a capstan will be anchored to the capstan using a swaged ball arrangement. Similarly, whenever a cable is wrapped around an idler pulley, a swaged ball 118 and slot 120 arrangement will be used. Finally, with respect to the differential drive pulleys 76 and 78, such a swaged arrangement is also be used. This is because the ends of the cables associated therewith are not anchored to a structural member, but rather tied to one another.

As discussed previously, control of the system of the present invention is generally open-loop. That is, drive signals are supplied to motors 14 which turn the various capstans for movement of the various drive cables. As result of the drive cable movement, the desired structural members are changed in position. It is assumed that each structural member will move in accordance with the drive signals supplied to its associated motor 14. Thus, errors can result in the position of the structural members when the motor 14 slips or when an external force causes the particular structural member to be moved out of position. Because no shaft encoders are utilized, there is no straightforward manner in which the actual position of each structural member can be easily obtained. The determination of structural member position is further complicated by the coupling between the various structural members as discussed above.

In the present invention, there is provided a method and apparatus for calibrating the position of each structural member. There is provided in association with the structural members which rotate about each of the various joints, a position sensor which provides an output which has one of two states. The transition between these two states is treated as a reference or home signal for the associated structural members for a particular joint. By positioning each of the structural members so that the position sensors associated with each joint all indicate a home signal, a reference or home position can be obtained. All subsequent movement of the various structural members can then be referenced to this home position. Additionally, any mispositioning of the various structural members can be determined by counting the number of commands or steps actually required to position a structural member into its home position and by comparing that number with the theoretical number of commands which should have been required to place the particular structural member into its home position.

Thus, upon the initial power-up of the robotic arm, or periodically during the operation of the arm, a homing mode can be entered into by which the arm can calibrate its position, determine any position errors, and thereby correct any mispositioning.

Referring to FIGS. 7a and 7b, a typical position sensor will now be described. FIG. 7a is a simplified view of a position sensor which can be disposed on the elbow joint 34. A portion of forearm 32 is shown mounted on elbow axle 56 with respect to a portion of upper arm 28. A tab 122 is shown positioned on forearm 32 at a predetermined radial distance from elbow axle 56. A light emitting diode (LED) phototransistor element 124 is shown positioned on upper arm 28 at the same predetermined radial distance from elbow axle 56. FIG. 7b is a view of the above-described arrangement taken along line 7b—7b of FIG. 7a. LED/phototransistor element 124 comprises a LED portion 126 and a phototransistor portion 128. These portions are aligned with one another and spaced apart by a gap 130. When gap 130 is clear, a light beam from LED portion 126 spans gap 130 and is detected by phototransistor portion 128. When forearm 32 and upper arm 28 are rotated with respect to one another, such that tab 122 is caused to enter gap 130, the light beam from LED 126 is blocked. The output of LED/phototransistor element 124 will be in one state when gap 130 is clear, and will be in another different state when tab 122 enters gap 130. The transition between the two different states is treated as an edge or state transition and plays a key role in the method of position sensing of the present invention.

Similar position sensors are disposed on the shoulder joint 30 and the base joint 26. It is to be understood that other forms of position sensors can be utilized with satisfactory results. Such sensors include microswitches, and the like.

Due to the arrangement of the cables which drive the differential drive pulleys 76 and 78, a different position sensor is provided for the wrist joint. FIG. 8 illustrates such a sensor.

As discussed above, the ends of drive cable 70 are tied to one another at junction 116. See FIG. 5. Similarly, the ends of drive cable 82 are tied to one another at junction 117. Typically, these junctions take the form of turnbuckles which permit easy adjustment of the tension of the cables. In FIG. 8, turnbuckle 132 can be seen to join the ends of cable 70 together, while turnbuckle 134 can be seen to join the ends of cable 82 together. Recall from the above discussion that cable 70 is fastened to differential drive pulley 76 by a swaged ball disposed in a slot within differential drive pulley 76, and that cable 82 is fastened to differential drive pulley 78 in a similar manner. Thus, the position of each of the differential drive pulleys 76 and 78 can be related directly to the position of cables 70 and 82.

Thus, it follows that a sensing of the position of drive cable 70 and drive cable 82 will provide an indication of the position of each of the differential drive pulleys 76 and 78.

In order to provide such a position sensing of the cable positions, the arrangement of FIG. 8 is provided. FIG. 8 shows a cutaway portion of forearm 32. Cables 70 and 82 are shown passing through this portion. These cables 70 and 82 both pass through apertures within plates 136 and 138. Plate 136 is pivottably mounted to forearm 32 by way of shaft 140, while plate 138 is pivotably mounted to forearm 32 by shaft 142. Shaft 144 provides a pivot-limit to plate 136 while shaft 148 provides the pivot-limit to plate 138. A spring 150 is connected between the tops of plates 136 and 138 to bias the tops of the plates towards one another. The plates 136 and 138 are located with respect to one another and with respect of drive cables 70 and 82 so that joints 116 and 117 are located between the plates 136 and 138. Positioned at joint 116 is a disc 152, while positioned at joint 117 is a disc 154. Each of these discs is positioned at right angles to their associated cables.

Plates 136 and 138 also serve as mechanical stops for each of the cables; thus, plate 138 serves as a mechanical stop for cable 70, while plate 136 serves as a mechanical stop for cable 82. In the position sensor illustrated in FIG. 8, the position of each cable associated with the end of the cable travel is chosen as the position to be sensed. Thus, plate 138 is shown positioned with respect to disc 152 on joint 160 so that when disc 152 engages with plate 138, cable 70 is at the end of its desired travel. Likewise, plate 136 is shown positioned with respect to joint 170 and disc 134 such that when disc 134 engages with plate 136, cable 82 is at the end of its desired travel.

Shown positioned on plate 138 is a tab 156 and a LED/phototransistor element 158, which function in a manner similar to the position sensor described in connection with FIGS. 7a and 7b. When disc 152 is disengaged from plate 138, spring 150 biases plate 138 such that tab 156 is separated from LED/phototransistor 158. Conversely, when disc 152 engages plate 138, tab 156 interrupts the light beam within the gap of LED/phototransistor 158. A similar tab and LED/phototransistor arrangement is disposed toward the bottom portion of plate 136. In order to simplify the figure, the tab and LED/phototransistor structure associated with plate 136 is not shown. In operation, the tab of this structure is disposed within the gap of the LED/phototransistor element when disc 154 is disengaged from plate 136. Conversely, when disc 154 is engaged with plate 136, the tab is removed from the gap of the LED/phototransistor element. Thus, the signals provided by each of these structures are opposite in polarity.

Preferably, the position sensors are located on the structural members such that only one state transition can occur in the range of motions for the particular structural members. Thus, in this configuration, the state of the position sensors also indicates in what direction the structural members should be manipulated in order to produce or attain the state transition or home position.

The manner in which the outputs from these various position sensors is utilized to provide position calibration will now be explained in greater detail. Referring to FIG. 9, a method of utilizing the signals from the above-described position sensors to calibrate the position of the robotic arm will now be described. In general, the method involves three stages, the first of which is shown in step 160. In this step, drive signals are provided, in parallel, to all of the motors 14 until a transition in the output state for each position sensor is detected. These transitions are also called edges. When a particular sensor outputs a transition, the associated structural member is caused to move back and forth across this transition. When all of the position sensors have provided an output state transition, step 162 is executed.

In step 162, the motors 14 are driven in an ordered sequence. This ordered sequence begins with the driving of the motor 14 associated with the structural member having the highest degree of coupling to the other structural members. Recall from the discussion above, because of the use of idler pulleys and their relationship to the various joints of the robotic arm, the movement of certain of the structural member about a particular joint, will cause movement of other structural members about a different joint. Thus, in the configuration of the present invention, wherein an outward coupling is provided, the hand 36 would have the least amount of coupling. Additionally, because there are no idler pulleys associated with the base joint 26, other than the idler pulleys for the base drive cables 110, the base 24 itself has a low degree of coupling to the remainder of the structural members. The forearm 32 has the next lowest degree of coupling with respect to the other structural members. Finally, the upper arm 28 has the highest degree of coupling to the other structural members. Thus, step 162 would operate upon upper arm 28 initially, followed by forearm 32, and then hand 36. It is to be understood that this sequence will change if the coupling between the structural members changes. Thus, if there were inward coupling, such that the hand 36 had the highest degree of coupling and the upper arm 28 had the lowest degree of coupling, the hand 36 would be processed first and the upper arm 28 would be processed last.

In step 162, then, each motor 14 would be driven in the ordered sequence, until its associated position sensor indicated that a home state had been reached. As used herein, home state is defined as an arbitrary state of a particular position sensor, the state being determined by the output state of the position sensor on one side of the edge or transition. Recall that each position sensor supplies one of two output states, and that the transition between these states is of key interest. Because it is difficult to maintain the position of a structural member so that the associated position sensor is at its output transition, a position to one side or the other of the transition is designated as the home state. Thus the home state for a particular position sensor corresponds to the sensor output state for a position a small distance removed from the transition position, and in a predetermined direction. For example, with respect to the position sensor shown in FIG. 7a and FIG. 7b, the home state would be chosen as that which indicates that the tab 122 is positioned within gap 130. Conversely, with respect to the position sensor associated with plate 136 of FIG. 8, the home state would be chosen to correspond to the output of the LED/phototransistor element when the tab is removed from gap.

After each of the motors 14 has been driven to cause the associated position sensors to assume their home state, step 164 is executed. In step 164, the motors 14 are driven, in the same ordered sequence as in step 162, to cause their associated structural members to move in the opposite direction by a predetermined amount until the position sensor makes a transition out of its home state. The purpose of step 164 is to ensure that each of the joints is positioned within a preselected incremental position of the transition point of the position sensors.

Thus, after step 164 has been successfully completed, all of the structural members can be said to be within one incremental unit of their home position.

Referring to FIG. 10, the homing method will be described in greater detail and in conjunction with the intelligent controller 12 and motor drive circuitry shown in FIG. 1. As discussed previously, the structural members of the robotic arm 10 are controlled by a cable and pulley system which are, in turn, driven by motors 14. Motors 14 receive drive signals from motor driver circuitry 22. In turn, motor driver circuit 22 receives instructions from an intelligent controller 12. This intelligent controller 12 can be a general purpose microcomputer or a dedicated microprocessor. The intelligent controller 12 receives the outputs of the various position sensors via line 166.

It is to be understood that the embodiment which will be subsequently described is but one of a number of possible implementations of the position calibration method of the present invention. Other embodiments can include separate hardware for controlling each of the different positioning and sensing sequences.

Utilizing the system of FIG. 1, the intelligent controller 12 maintains a internal set of position registers, sensor state registers, and toggle registers. For purposes of explanation, it is to be assumed that motors 14 are stepper motors such that the drive signals provided to the motors by motor driver circuitry 22 are in the form of a series of unit steps. As such, the number of unit steps provided to a particular stepper motor 14 can be related to the position of the structural member which is controlled by the particular stepper motor 14. Thus, the position register maintained by intelligent controller 12 are intended to keep track of the number of unit steps supplied to each stepper motor. The toggle registers are intended to keep track of whether each of the sensors has gone through a transition in its output state, thereby indicating that a home position has been encountered. The sensor state registers are intended to maintain a record of the state of each position sensor at particular points in the calibration sequence.

In practice, the position registers can be up/down counters such that a net-position count will be maintained. For example, when the intelligent controller 12 provides a sequence of unit steps corresponding to the rotation of the stepper motor in a particular direction, the up/down counter would increment its count by the number of steps within the command. When the intelligent controller 12 provides a number of steps which will cause the motor to rotate in an opposite direction, the up/down counter will decrement its count by that number of steps. Thus, the resulting count within the up/down counter will be a net position count.

Referring to FIG. 10, step 168 corresponds to the power-on and reset mode of the control system. Typically, this includes the application of power to the stepper motors, and the stablization of the various control circuits, drive circuits, and the various structural members within robotic arm 10. After the power-on/reset phase in step 168, step 170 is processed in which the state of the position registers is set to zero. This provides an initial starting point for the intelligent controller 12. Preferably, the arm 10 is in its home position at this step. After step 170, step 172 is executed in which the robotic arm 10 is operated in its normal mode, or in an idle state. At some time during this step 172, either as in initialization procedure or periodically during the normal operation of the arm, the intelligent controller 12 will be instructed to enter step 174, which corresponds to the start of the homing or position calibration operation. When such an operation is desired, step 176 is first executed. In this step, the robotic arm is moved from whatever its current position back to the position which corresponds to a position register state of all zeros. Preferably, when in step 170 the position registers were set to zero, the robotic arm 10 was at or near its home position. If such were the case when step 170 was processed, step 176 will cause the arm to move to a point which is in the approximate area of the home position of the arm 10.

During step 176, all of the structural members are driven simultaneously. Typically, step 176 is executed over a predetermined time. By examination of the position register states, the intelligent controller 12 can determine which structural member is required to move the furthest. The motor corresponding to that particular structural member would then be provided with an uninterrupted series of steps, the number of which would correspond to the number contained in the appropriate position register. The stepper motors corresponding to those structural members which are a lesser number of steps away from position zero will be provided with a drive signal in which steps are inserted periodically during the signal to the structural member having to move the furthest. The period with which these steps are inserted is a function of the number of steps which must be output to the particular motor and the amount of time allotted therefor.

After step 176 is completed, the toggle registers are set to zero in step 178. This prepares the toggle registers to record whether or not a transition has occurred in each of the position sensor outputs for each of the structural members. After step 178, step 180 is executed in which the sensor state registers are set to the then current values of the position sensor outputs. After step 180 has been completed, step 182 is executed in which all of the motors are commanded, simultaneously, to move a predetermined unit step in the direction of the transition point of each position sensor.

As discussed in connection with the position sensors, in the preferred embodiment, the position sensors are located so that there is a single transition within the range of motion of the particular structural member with which it is associated. As such, by knowing the state of the position sensors, the direction of the state transition, and hence that of the home position, can be derived therefrom.

Thus, in step 182, the intelligent controller will be able to determine the direction in which to command each motor to move, such that the resulting movement will be toward the sensor edge or transition point. The speed at which each motor is commanded to turn in step 182 is typically lower than that used in step 176. At the end of each unit of movement in step 182, the intelligent controller 12 examines the outputs of all of the position sensors, step 184. If the sensor output for a particular sensor is equal to the sensor state in its corresponding sensor state register, it is clear that no transition has occurred, and that the home state for the structural member has not yet been reached. Step 184 is repeated for each of the position sensors. If, with respect to a particular position sensor, a change in state is detected, the corresponding toggle register is set to one in step 186. After all position sensors have been examined in step 184 and after any transitions which are detected are accounted for in step 186, step 188 is then processed. In step 188, the intelligent controller 12 determines whether all of the toggle registers have been set to one. If not, the system returns to step 180 in which the sensor registers are reset to the then current output states of the position sensors. Step 182 is then repeated to move each of the structural members one more unit step toward their sensor edge. For the position sensors in which a transition had previously occurred, the execution of step 182 will cause the structural member to move one step in the opposite direction. Thus, when step 184 is again executed, the corresponding toggle register will again be set to one in step 186. Thus, the sequence of steps 180, 182, 184, 186 and 188 will move each of the structural members toward their corresponding position sensor edge, and once such edge is encountered for each structural member, cause that structural member to vary in position about that sensor edge.

After all of the toggle registers have been set to one, the system will proceed out of step 188 and into step 190. In step 190, the intelligent controller will determine whether or not the sensor is in its designated home state. Recall that the home state is in arbitrarily selected output value, which has been selected for each of the position sensors. The value of the home state designates upon which side of the transition in the position-detector state a home state will be said to be located.

Steps 190 and 192, which are entered if the result of step 190 indicates that all toggle registers have been set to one, are executed in connection with one motor at a time. Additionally, the motors are operated upon in a predetermined sequence. In this set of step sequences, the coupling between the various structural members is taken into account to minimize the interaction of one member upon the others. Thus, the motors and their associated structural members are operated upon in a sequence which begins with the structural member having the greatest amount of coupling to the other structural members, and continues with the structural member having the next lower amount of coupling. The sequence ends with the structural member and associated motor having the least degree of coupling with respect to the other structural members. Thus, in the outwardly coupled embodiment described above, the upper arm 28 will be processed first followed by the forearm 32 and then the hand 36.

If in step 190 the structural member being currently operated upon is not in its home state, the intelligent controller 12 will cause the motor to move the structural member, slowly, one unit step toward the home state. A gradual or slow movement is utilized here to prevent the movement of the particular structural member from creating vibrations which could potentially cause the states of the other position sensors to change. In the preferred embodiment, because of this vibration problem, the base position is modified first, even though the base 24 has a low degree of coupling. This avoids moving a lot of mass at the end of the calibration sequence.

Steps 190 and 192 are repeated for each of the structural members, in accordance with the sequence discussed above, until all position sensors are in their respective home states. When this occurs, steps 194 and 196 are then executed for each motor and associated structural member and in accordance with the designated sequence, as discussed above. As can be seen from a comparison of steps 190/192 and 194/196, that the operations are similar. The purpose of executing step 194 and step 196 is to provide a second check of the position sensor states and to allow for the situation where a structural member, subsequently, has been moved out of position due to the movement of structural members processed later in the sequence in step 190 and 192.

If, in step 194, the position sensor for the particular motor and associated structural member is in the desired home state, step 198 is then processed. In step 198, the intelligent controller 12 causes the motor to move slowly one step away from the desired home position. The sensor state is then checked in step 200. Step 200 is provided to ensure that the sensor is within one step of its transition point. Thus, if in step 200, the sensor is still in its home state, this is indicative that the transition point has not been crossed. Thus, the system will proceed back to step 198 and move the structural member and motor one step closer to the home position.

Steps 194/196 and 198/200 are repeated for each motor and associated structural member, and in accordance with the predetermined sequence discussed above. When all of the position sensors have been backed off a unit step from their home state, the system is then in a position-calibrated mode. In this mode, all of the position sensors are positioned within one unit step of the position sensor transition point. Hence, all of the structural members are in one unit step of their home position.

Upon final completion of step 200, the intelligent controller 12 proceeds to step 202. While step 202 is not essential to the operation of the method of the present invention, the execution of this step is valuable in determining whether any positional errors exist. In step 202, the contents of the position registers are examined. Assuming that the robotic arm 10 was in its home position when the position registers were set to zero in step 170, the position registers should theoretically equal zero at step 202. If there are non-zero quantities in the position registers, this is indicative that the robotic arm has somehow been moved by an external force, or that the stepper motors have slipped in some manner.

The quantity in the position registers is also valuable in calculating the amount of force being applied by a particular structural member to an external object. This is because force supplied by the structural member can be related to the number of steps slipped by the associated drive motor 14. This force is also a function of the moment arm associated with the structural member and with the speed of the arm.

After step 202 has been executed, the system returns to step 170 in which the position registers are set to zero. This then causes the zero condition of the position registers to correspond to the home position of the robotic arm. After step 170, the system returns to normal operation and/or idle operation until another homing or position calibration operation is desired.

As a result of the provision of position sensor associated with each of these structural members and with the implementation of the method of position calibration described above, a robotic arm and control system is obtained which provides a semi-closed loop control. As such, there is improved performance over the prior open loop, tendon driven, robotic arm, at a cost and complexity which is far below that of the more precise and costly industrial prior art robotic arms.

Unlike the prior art industrial arms which employ shaft encoders, the present invention employs position sensors which generate a transition between two different states when the home position or reference point is reached for the particular structural member. The present invention is then able to utilize this transition information to provide an accurate position calibration.

This capability is further enhanced by the method of routing the tendons or drive cables, from drive capstans to idler pulleys and to drive pulleys, as described above. The utilization of a swaged ball on each cable, which is then inserted into the capstan and idler pulleys, further enhances the precision of the position calibration system, as well as the precision of operation of the arm during normal operation.

The terms and expressions which have been employed herein are used as terms of description and not of limitation, and there is no intention, in the use of such terms and expressions, of excluding equivalents of the features shown and described, or portions thereof, it being recognized that various modifications are possible within the scope of the invention claimed.

We claim:

1. In a multiaxis, open-loop system of coupled structural members, wherein each structural member is linked for relative movement with another of the structural members to form a number of joints, an apparatus for position-calibrating each structural member with respect to one another upon receipt of a homing command, comprising a plurality of position sensor means, a different one of the plurality of position sensor means associated with each joint for providing a home signal when the structural members which are coupled at the corresponding joint are in a predetermined orientation;

control means responsive to the home signal from each position sensor means for modifying the position of each structural member in a predetermined order and by predetermined positional increments so that each of the structural members is caused to be positioned with respect to one another such that all position sensor means simultaneously provide home signals, wherein the control means include a plurality of structural member actuator means, each corresponding to a particular structural member and responsive to position commands for manipulating the corresponding structural member;

parallel stepping means responsive to the homing command for providing the position commands to the actuator means to simultaneously change the position of each structural member by a predetermined incremental amount until the home signal has been received form each position sensor means and for thereafter providing a home-detected signal;

sequential stepping means responsive to the home-detected signal for providing the position commands to the actuator means to increment the position of each structural member in accordance with a preordered sequence so that the position sensor means corresponding to each structural member indicates a home condition; and backoff means for changing the position of the structural members in an ordered sequence one increment away from their home condition.

2. The apparatus of claim 1 further including means for recording the net number of steps required to reach the home position for each structural member.

3. The apparatus of claim 1, wherein the parallel stepping means include sensor state means for storing the current state of each position sensor;

incrementing means for providing position commands to the actuator means to move each structural member a unit step in the direction of the corresponding position sensor home position until all home positions have been encountered; and toggle register means responsive to the position sensors for indicating for each position sensor whether the home position has been encountered and for providing the home-detected signal when all home positions have been encountered.

4. The apparatus of claim 3, wherein each structural member has a designated degree of coupling and further wherein the sequential stepping means includes means for changing the position of each structural member in a predetermined order, wherein the structure having the lowest degree of coupling is manipulated first followed by manipulation of the structures having an increasing degree of coupling;

means for manipulating the position of each structural member one incremental amount at a time into a new position and for thereafter determining whether a home position signal from the corresponding position sensor has resulted; and means for indicating that all structural members are in the home state.

5. The apparatus of claim 1, wherein the backoff means include means for changing the position of the structural members in a predetermined order, wherein each structural member is moved away from its home position by a unit step corresponding to the incremental amount; and means for determining whether each structural member thereafter remains at the home position.

6. The apparatus of claim 1 further including a base for supporting the structural members, wherein each of the actuator means include motor means mounted to the base and responsive to position commands for providing a corresponding rotational displacement on a motor shaft;

cable means positioned about the motor shaft for transferring the rotational displacement of the motor shaft to the corresponding structural member to be actuated; and drive pulley means responsive to the cable means and fixedly attached to the structural member to be actuated for transferring the motion of the cable means to the structural member, wherein the drive pulley means is grooved about its outer periphery.

7. The apparatus of claim 6, wherein the cable means include a drive shaft supported by the base;

capstan means rotatably supported by the drive shaft, wherein the capstan means include a plurality of grooves about its outer periphery;

means for transferring the rotational displacement of the motor shaft to the capstan means; and a predetermined length of cable having a first portion which is wrapped around the outer periphery of the drive pulley means and positioned in the grooves of the drive pulley means, and a second portion which is wrapped around the outer periphery of the capstan means and positioned in the grooves of the capstan means, whereby the rotational motion of the motor shaft is communicated to the structural member to be actuated to cause the structural member to change position by a predetermined amount.

8. The apparatus of claim 7, wherein the grooves of the drive pulley means and the capstan means extend spirally about the outer periphery of the drive pulley and capstan means with a predetermined pitch and a predetermined number of grooves per inch.

9. The apparatus of claim 8, wherein the pitch of the grooves of the drive pulley means is equal and opposite to the pitch of the grooves of the capstan means.

10. The apparatus of claim 8, wherein the structural member to be actuated is coupled to the base by an intermediate structural member further including idler pulley means intermediately positioned between the capstan means and the drive pulley means for supporting the predetermined length of the cable as it passes through the intermediate structural member, the cable being wrapped around the outer periphery of the idler pulley and positioned in grooves disposed on the outer periphery, and further wherein the pitch of the grooves of the capstan is equal and opposite to the pitch of the grooves of the idler pulley means, and further wherein the pitch of the grooves of the idler pulley means is equal and opposite to the pitch of the grooves of the drive pulley means.

11. The apparatus of claim 8 further including a plurality of idler pulley means positioned intermediate the drive pulley means and the capstan means for rotatably supporting the predetermined length of cable, each idler means having a plurality of grooves positioned on the outer periphery of predetermined pitch and density, for receiving the predetermined length of cable, wherein the cable extends from the capstan means, to each of the plurality of idler pulley means in a predetermined sequence, and thence to the drive pulley means, and further wherein the pitch of the grooves are equal but of alternating direction from capstan means to the first idler pulley means of the sequence, through the other idler pulley means of the sequence, and thence to the drive pulley means.

12. The apparatus of claim 7, wherein the capstan means and the drive pulley means each have a portion of the length of cable fixedly attached to their outer periphery.

13. The apparatus of claim 12, wherein the capstan means and the drive pulley means each have a slot which is radially positioned on the outer periphery, and further wherein the portion of the length of cable which is wrapped around the capstan means and the portion of the length of cable which is wrapped around the drive pulley means are both wedged within the corresponding slot by way of a spherical member which is swaged onto the cable and then inserted into the slot along with the cable.

14. In a multiaxis, open-loop system of coupled structural members, wherein each structural member is linked for relative movement with another of the structural members to form a number of joints, an apparatus for position-calibrating each structural member with respect to one another upon receipt of a homing command, comprising a plurality of position sensor means, a different one of the plurality of position sensor means associated with each joint for providing a home signal when the structural members which are coupled at the corresponding joint are in a predetermined orientation, wherein a first and second structural member are connected to be relatively moveable at a joint and the position sensor means senses the position of a cable which passes along the first structural member and which drives the second structural member, and further wherein the sensor means include a plate pivotably connected to the first structural member and having an aperture, wherein the cable passes through the aperture and the plate is positioned to be at approximate right angles to the cable;

cable stop means fixedly attached to the cable in the vicinity of the plate so that the cable stop means will engage the plate upon a predetermined amount of movement by the cable; and means for providing the home signal when the cable stop means and the plate engage one another; and control means responsive to the home signal from each position sensor means for modifying the position of each structural member in a predetermined order and by predetermined positional increments so that each of the structural members is caused to be positioned with respect to one another such that all position sensor means simultaneously provide home signals.

15. A method of position-calibrating a multiaxis, open loop system of coupled structural members, wherein each of the structural members is relatively moveable with respect to another structural member to form a number of joints and so that movement of one structural member affects the position of certain others of the structural members, and further wherein each joint includes a position sensor for providing a home signal whenever the structural members coupled at that joint achieve a predetermined home orientation with respect to one another, and wherein the position of each structural member is manipulated by a corresponding actuator means, the method comprising the steps of (a) commanding all actuator means to change the position of the corresponding structural member a unit step at a time until a home signal from each position sensor is received;

(b) commanding each of the actuator means in accordance with a predetermined sequence to change the position of the corresponding structural member toward the predetermined home orientation a unit step at a time until the home signal is again received, wherein the predetermined sequence in which the actuator means are commanded begins with the actuator means corresponding to the structural member having the highest degree of coupling to the other structural members and ends with the actuator means corresponding to the structural member having the lowest degree of coupling to the other structural members; and (c) commanding each of the actuator means in accordance with the predetermined sequence to change the position of the corresponding structural member until each structural member is one unit step away from its predetermined home orientation.

16. The method of claim 15, further including the steps of maintaining a position count for each structural member, wherein the position count is begun when all structural members are in the home position; and initializing the position count when all of the structural members are in the predetermined home orientation, so that the position count represents a general indication of the direction and number of unit steps distant a particular structural member is from the corresponding predetermined home orientation.

17. The method of claim 16, wherein step (a) includes the steps of
(i) commanding each actuator means to change the position of the corresponding structural member by a number of unit steps corresponding to the position count for the corresponding structural member;
(ii) recording the current state of each position sensor;
(iii) commanding each actuator means to change the position of the corresponding structural member by a unit step;
(iv) comparing the current state of each position sensor to the state recorded in step (ii);
(v) providing a toggle indication for each of the position sensors for which a difference in state is detected in step (iv) and wherein a change in state of a particular position sensor is designated as the home signal; and
(vi) repeating steps (ii) through (v) until a toggle indication has been recorded for all position sensors.

18. The method of claim 17, wherein a predetermined home state has been designated for each position sensor which corresponds to the state of the position sensor when the corresponding structural member is positioned one unit step away from its predetermined home orientation, and further wherein step (b) includes the following steps which are executed for each structural member according to the predetermined sequence beginning with the structural member having the highest degree of coupling and ending with the structural member having the lowest degree of coupling, including the steps of
(i) comparing the current state of the position sensor to the home state of the position sensor;
(ii) commanding the actuator means to move the structural member one unit toward its predetermined home orientation when a difference in states is found in step (i); and
(iii) repeating steps (i) and (ii) for each actuator means and corresponding structural member according to the predetermined sequence until each position sensor is in its home state.

19. The method of claim 18 wherein step (c) includes the following steps which are executed for each structural member according to the predetermined sequence, beginning with the structural member having the highest degree of coupling and ending with the structural member having the lowest degree of coupling, including the steps of
(i) commanding the actuator means to move the structural member one unit step away from the predetermined home orientation;
(ii) comparing the current state of the position sensor to the home state of the position sensor; and
(iii) repeating steps (i) and (ii) for each actuator means and corresponding structural member according to the predetermined sequence, until each position sensor is no longer providing its home state.

20. The method of claim 19 further including the following steps preliminary to steps (i) through (iii), including the steps of
(aa) determining whether the position sensor is in its home state;
(bb) commanding the actuator means to move the structural member one unit step toward the predetermined home orientation;
(cc) repeating steps (aa) through (bb) for each actuator means and corresponding structural member according to the predetermined sequence until each position sensor is in its home state.

21. In an open-loop system of structural members, wherein each structural member is linked for relative pivotable movement with another of the structural members at a different one of a plurality of joints, and further wherein at least two of the structural members are intercoupled such that the movement of one of the intercoupled structural members about a joint results in movement of the other intercoupled structural member about a different joint, an apparatus responsive to a homing command for position-calibrating the structural members with respect to a predetermined home position for each joint, comprising
a plurality of home position means, each of which is associated with a different joint, each for providing positional information about the particular structural members coupled at the associated joint, said positional information including an indication of the direction of the predetermined home position for that joint from the current position of the particular structural members, and a home signal when the particular structural members are in the predetermined home position; and
control means responsive to the home signal and to the direction indication from each home position sensor means for modifying the position of all structural members in parallel in the direction of their associated predetermined home position until all position sensing means have generated a home signal, wherein the control means reverses the direction or movement of any particular structural member whenever the associated home sensor means for the particular structural member indicates a transition from one side of its associated predetermined home position to the other, so that the position of the particular structural member is caused to vary about its associated predetermined home position until all other home position sensor means have generated a home signal and wherein the control means include means operative after all position sensing means have generated a home signal for modifying the position of each structural member, one at a time, in a predetermined order and by predetermined positional increments so that each of the structural members is caused to be moved to within a predetermined distance from its home position.

22. The apparatus of claim 21, wherein each of the home position sensor means provides a first signal when the joint is in a first range of positions and a second signal, which is different from the first signal, when the joint is in a second range of positions different from the first range of positions, wherein a transition between the first and second signals occurs when the predetermined home position of the corresponding structural members is encountered.

23. The apparatus of claim 22, wherein a joint is formed by the pivotal connection of two structural members and further wherein the home position sensor means include light source and photo-detector means which are positioned on one of the structural members to form an optical link; and interruptor means which are positioned on the other structural member for interrupting the optical link when the two structural members attain a predetermined orientation with respect to one another.

24. The apparatus of claim 21, wherein each home position sensor means provides a transition between a first signal and a second signal when the home position of the corresponding structural members is encountered, such that the only signals provided by each home position sensor means are the first signal, the second signal, and the transition between the first and second signals.

25. In an open-loop system of structural members, wherein each structural member is linked for relative pivotable movement with another of the structural members at a different one of a plurality of joints, and further wherein at least two of the structural members are intercoupled such that the movement of one of the intercoupled structural members about a joint results in movement of the other intercoupled structural member about a different joint, an apparatus responsive to a homing command for positioning the structural members in a home orientation, comprising a plurality of home position means, each of which is associated with a different joint, each for providing a first signal when the position of the particular structural members coupled at the associated joint is to one side of a predetermined home position for that joint, a second signal when the position of the particular structural members is to the other side of t he predetermined home position, and a home signal when the particular structural members are in the predetermined home position; and control means responsive to the home signal and the direction indication from each home position sensor means for modifying the position of all structural members in parallel in the direction of their associated predetermined home position until all position sensing means have generated a home signal, wherein the control means reverses the direction of movement of any particular structural member whenever the associated home sensor means for the particular structural member indicates a transition from one side of its associated predetermined home position to the other, so that the position of the particular structural member is caused to vary about its associated predetermined home position until all other home position sensor means have generated a home signal and wherein the control means include means operative after all position sensing means have generated a home signal for modifying the position of each structural member, one at a time, in a predetermined order and by predetermined positional increments so that each of the structural members is caused to be moved to within a predetermined distance from its home position.

* * * * *